(12) United States Patent
Kinoshita et al.

(10) Patent No.: US 11,110,937 B2
(45) Date of Patent: Sep. 7, 2021

(54) DRIVING ASSISTANCE SYSTEM

(71) Applicant: TOYOTA JIDOSHA KABUSHIKI KAISHA, Toyota (JP)

(72) Inventors: Atsuki Kinoshita, Amagasaki (JP); Jun Sato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 16/297,920

(22) Filed: Mar. 11, 2019

(65) Prior Publication Data

US 2019/0276049 A1 Sep. 12, 2019

(30) Foreign Application Priority Data

Mar. 12, 2018 (JP) .............................. JP2018-044368

(51) Int. Cl.
*B60W 50/14* (2020.01)
*G08G 1/16* (2006.01)
*G05D 1/02* (2020.01)

(52) U.S. Cl.
CPC .......... *B60W 50/14* (2013.01); *G05D 1/0214* (2013.01); *G08G 1/166* (2013.01); *G08G 1/167* (2013.01); *B60W 2050/143* (2013.01); *G05D 2201/0213* (2013.01)

(58) Field of Classification Search
CPC .......... B60W 50/14; B60W 2050/143; B60W 2520/10; B60W 2520/14; B60W 2554/00; B60W 10/04; B60W 10/18; B60W 10/20; B60W 30/08; B60W 30/09; B60W 30/0956; G08G 1/167; G08G 1/166; G08G 1/165; G05D 1/0214; G05D 2201/0213
See application file for complete search history.

(56) References Cited

U.S. PATENT DOCUMENTS

2007/0013497 A1 1/2007 Watanabe
2017/0285646 A1\* 10/2017 Connor ................. B60W 40/04
2018/0181820 A1 6/2018 Ide

FOREIGN PATENT DOCUMENTS

| JP | 2004-78333 A | 3/2004 |
| JP | 2007-001333 A | 1/2007 |
| JP | 2008-114672 A | 5/2008 |
| JP | 2018-103863 A | 7/2018 |

\* cited by examiner

*Primary Examiner* — Michael V Kerrigan
(74) *Attorney, Agent, or Firm* — Sughrue Mion, PLLC (57) ABSTRACT

A driving assistance system 1 comprises: an information providing device 2 providing information to a driver of a vehicle; a surrounding information acquiring device 3 acquiring information on surroundings of the vehicle; a target path calculating part 41 calculating a target path of the vehicle; a vehicle control part 42 making the vehicle run along the target path; a driving path calculating part 43 calculating a driving path of a preceding vehicle running in the same lane as the vehicle; a processing part 44 calculating a difference of the target path and the driving path; and an alarm part 45 issuing an alarm to the driver. The alarm part prompts the driver to pay attention or prompts the driver to perform at least one of steering and braking of the vehicle if the difference is equal to or larger than a predetermined value.

7 Claims, 6 Drawing Sheets

DRIVING ASSISTANCE SYSTEM

FIELD

The present invention relates to a driving assistance system.

BACKGROUND

It has been known in the past to provide a plurality of sensors at a vehicle and provide a driver with information on the surroundings of the vehicle detected by the sensors (for example, PTL 1).

CITATION LIST

Patent Literature

[PTL 1] Japanese Unexamined Patent Publication No. 2007-001333

SUMMARY

Technical Problem

However, if a forward obstacle is hidden by a preceding vehicle etc., the sensors cannot detect the obstacle. This particularly becomes a problem if the vehicle is being automatically driven along a target path.

For example, if detection of an obstacle is delayed by the presence of a preceding vehicle, correction of the target path or intervention by the driver fails to be fast enough and the driving mode is liable to be forcibly switched from the automated driving mode to the manual driving mode. In this case, the driver is required to respond quickly.

Therefore, an object of the present invention is to provide a driving assistance system which enables a driver to foresee the presence of an obstacle even if a forward obstacle is hidden by a preceding vehicle.

Solution to Problem

The summary of the present disclosure is as follows.

(1) A driving assistance system comprising: an information providing device providing information to a driver of a vehicle; a surrounding information acquiring device acquiring information on surroundings of the vehicle; a target path calculating part configured to calculate a target path of the vehicle based on the information on the surroundings; a vehicle control part configured to make the vehicle run along the target path; a driving path calculating part configured to calculate a driving path of a preceding vehicle running in the same lane as the vehicle based on the information on the surroundings; a processing part configured to calculate a difference of the target path and the driving path; and an alarm part configured to issue an alarm to the driver through the information providing device, wherein the alarm part is configured to prompt the driver to pay attention or prompt the driver to perform at least one of steering and braking of the vehicle if the difference is equal to or larger than a predetermined value.

(2) The driving assistance system described in above (1), wherein the alarm part is configured to prompt the driver to pay attention if the difference is equal to or larger than a first reference value, and prompt the driver to perform at least one of steering and braking of the vehicle if the difference is equal to or larger than a second reference value, and the second reference value is larger than the first reference value.

(3) The driving assistance system described in above (2), wherein the processing part is configured to calculate a direction in which the driving path deviates from the target path and the alarm part is configured to prompt the driver to steer the vehicle and instruct the driver of the direction in which the driving path deviates from the target path as a steering direction if the difference is equal to or larger than the second reference value.

(4) The driving assistance system described in above (1), wherein the alarm part is configured to prompt the driver to pay attention if the difference is equal to or larger than a first reference value, and the vehicle control part is configured to brake the vehicle if the difference is equal to or larger than a second reference value and the second reference value is larger than the first reference value.

(5) The driving assistance system described in above (1), wherein the alarm part is configured to prompt the driver to perform at least one of steering and braking of the vehicle if the difference is equal to or larger than a first reference value, and the vehicle control part is configured to brake the vehicle if the difference is equal to or larger than a second reference value and the second reference value is larger than the first reference value.

(6) The driving assistance system described in above (5), wherein the processing part is configured to calculate a direction in which the driving path deviates from the target path, and the alarm part is configured to prompt the driver to steer the vehicle and instruct the driver of the direction in which the driving path deviates from the target path as a steering direction if the difference is equal to or larger than the first reference value.

Advantageous Effects of Invention

According to the present invention, there is provided a driving assistance system which enables a driver to foresee the presence of an obstacle even if a forward obstacle is hidden by a preceding vehicle.

DESCRIPTION OF EMBODIMENTS

Below, referring to the drawings, embodiments of the present invention will be explained in detail. Note that, in the following explanation, similar component elements are assigned the same reference signs.

First Embodiment

First, referring to FIG. 1 to FIG. 5, a first embodiment of the present invention will be explained.

<Configuration of Driving Assistance System>

Figure 1:
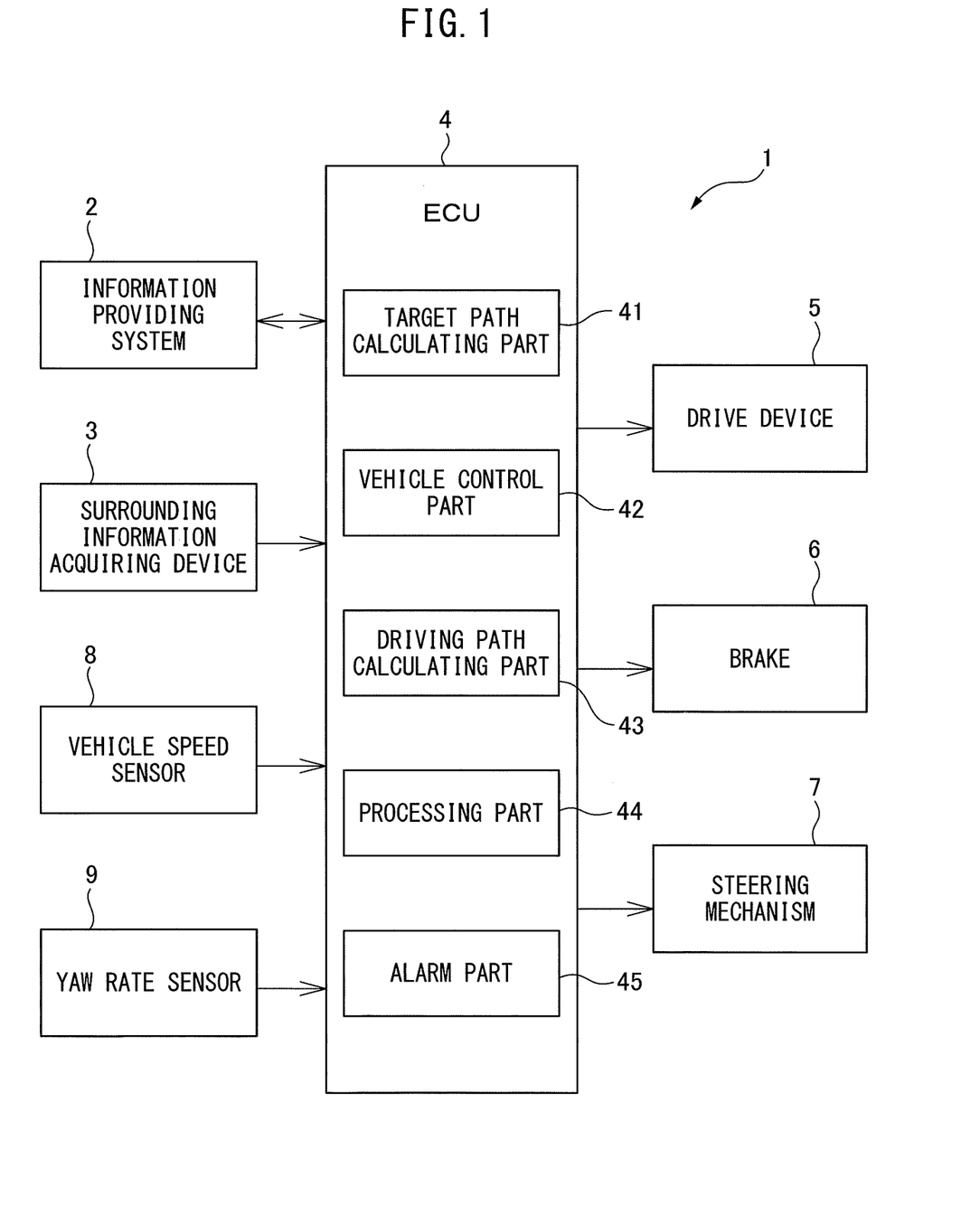
FIG. 1 is a block diagram showing the configuration of a driving assistance system according to a first embodiment of the present invention.

FIG. 1 is a block diagram showing the configuration of a driving assistance system 1 according to a first embodiment of the present invention. The driving assistance system 1 comprises an information providing device 2, surrounding information acquiring device 3, and electronic control unit (ECU) 4.

The information providing device 2 provides a driver of a vehicle (host vehicle) with information. The information providing device 2 is, for example, a human-machine interface (HMI) comprised of at least one of a touch screen, heads up display, digital meter panel, etc. The HMI is an interface for input and output of information between a driver and vehicle. The HMI is, for example, comprised of a display displaying text or image information, a speaker generating a sound, operating buttons for the driver to input operations, a microphone for receiving voice information from the driver, etc.

The surrounding information acquiring device 3 acquires information on the surroundings of the vehicle. The information on the surroundings includes white lines of the roads, other vehicles, pedestrians, bicycles, buildings, road signs, obstacles (fallen objects, curbstones, guard rails, construction sites, disabled vehicles, animals, etc.), etc. The surrounding information acquiring device 3 is comprised of at least one of a camera, milliwave radar, LIDAR (laser imaging detection and ranging) device, and sonar. The surrounding information acquiring device 3 acquires information on the surroundings every predetermined time period. The surrounding information acquiring device 3 is connected to the ECU 4. The output of the surrounding information acquiring device 3 is transmitted to the ECU 4.

The ECU 4 is a microcomputer provided with a memory such as a read only memory (ROM) and random access memory (RAM), a central processing unit (CPU), input port, output port, communication module, etc. In the present embodiment, a single ECU 4 is provided, but a plurality of ECUs may be provided for the different functions.

The outputs of the various sensors provided at the vehicle are input to ECU 4. The ECU 4 performs various controls of the vehicle based on the outputs of various sensors etc. In the present embodiment, the outputs of a vehicle speed sensor 8, a yaw rate sensor 9, etc. are input to the ECU 4.

The vehicle speed sensor 8 detects the speed of the vehicle. The vehicle speed sensor 8 is connected to the ECU 4. The output of the vehicle speed sensor 8 is sent to the ECU 4. The yaw rate sensor 9 detects the yaw rate which is the rotational speed about the vertical axis passing through the center of gravity of the vehicle. The yaw rate sensor 9 is connected to the ECU 4. The output of the yaw rate sensor 9 is transmitted to the ECU 4.

In the present embodiment, the ECU 4 runs programs etc., stored in the memory to function as the target path calculating part 41, vehicle control part 42, driving path calculating part 43, processing part 44, and alarm part 45. The target path calculating part 41 calculates the target path of the vehicle based on the information on the surroundings acquired by the surrounding information acquiring device 3. That is, the target path calculating part 41 analyzes the information on the surroundings to thereby calculate the target path of the vehicle.

For example, the target path calculating part 41 calculates the target path based on the white line information acquired by the surrounding information acquiring device 3. Specifically, the target path calculating part 41 detects the position of the white lines at the left and right of the vehicle and sets the center positions of the left and right white lines to the target path. In this case, the target path calculating part 41, for example, processes the image captured by the camera (stereo camera) of the surrounding information acquiring device 3 to thereby detect the candidate points of the left and right white lines.

Figure 2:
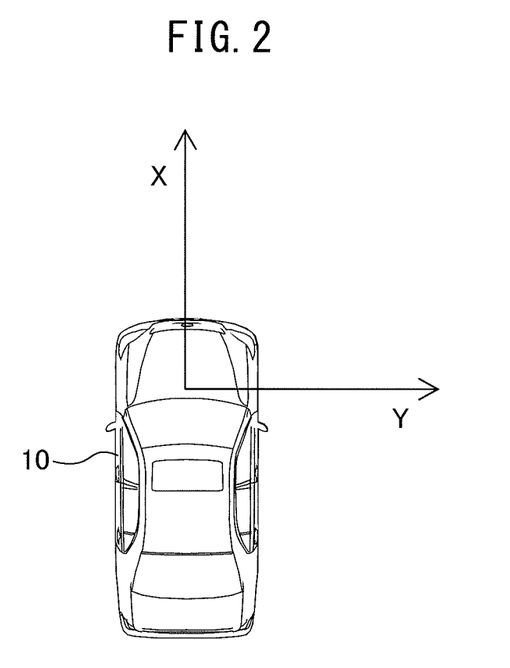
FIG. 2 is a view for explaining a reference coordinate system.

The target path calculating part 41 calculates the target path as a function of the reference coordinate system having the current position of the vehicle as its origin. For this reason, the candidate points of the white lines are mapped to a reference coordinate system having the current position of the vehicle as its origin. In the reference coordinate system, as shown in FIG. 2, the center axis in the front-back direction of the vehicle 10 is made the X-axis, while the axis perpendicular to the X-axis is made the Y-axis. Further, the origin is, for example, set at the center position of the left and right front wheels of the vehicle.

The target path calculating part 41 uses the center positions of the candidate points of the left and right white lines as target points and calculates the target path as an approximation function of the group of target points. The approximation function is, for example, defined by the quadratic function of the following formula (1):

$$Y = A \cdot X^2 + B \cdot X + C \tag{1}$$

In the above formula (1), the coefficients A, B, and C show the path components forming the target path. The coefficient A shows the curvature component of the target path. The coefficient B shows the yaw angle component of the target path (an angle component between front-back direction of vehicle and the tangential line of target path). The coefficient C shows the distance component in the lateral direction of the target path with respect to the vehicle. For example, by applying the least square method to the group of target points, the coefficients A, B, and C are calculated and the approximation function of the above formula (1) is calculated. Note that, the target path calculating part 41 may calculate approximation functions for the left and right white lines, use the center positions calculated from the two approximation functions as target points, and use the approximation function of these target points as the target path.

Further, the target path calculating part 41 corrects the target path so as to avoid an obstacle on the target path if detecting an obstacle. Note that, the target path may be displayed on the information providing device 2. By doing this, the driver can learn of danger from the displayed target path if the driver finds an obstacle on the target path before the target path is corrected.

If the driving mode of the vehicle is set by the driver to the automated driving mode, the vehicle control part 42 controls the acceleration, braking, and steering of the vehicle. The vehicle control part 42 uses a drive device actuator to activate the drive device 5 and thereby control acceleration of the vehicle. The drive device 5 is the source of drive power of the vehicle and is at least one of an engine and motor. Further, the vehicle control part 42 uses a brake actuator to operate the brake 6 to thereby control the braking of the vehicle. Further, the vehicle control part 42 uses a steering motor to operate the steering mechanism 7 so as to control steering of the vehicle.

The vehicle control part 42 makes the vehicle run along the target path calculated by the target path calculating part 41. Specifically, the vehicle control part 42 controls the steering of the vehicle so that the vehicle runs along the target path. Further, the vehicle control part 42 controls the acceleration and braking of the vehicle so that the distance to the preceding vehicle becomes a predetermined distance.

The predetermined distance is set to a suitable value corresponding to the relative speeds of the vehicle and the preceding vehicle. Note that, if no preceding vehicle is present, the vehicle control part 42 controls acceleration and braking of the vehicle so that the speed of the vehicle becomes a predetermined speed.

The driving path calculating part 43 calculates the driving path of a preceding vehicle running in the same lane as the vehicle (below, simply referred to as a "preceding vehicle") based on the information on the surroundings acquired by the surrounding information acquiring device 3. That is, the driving path calculating part 43 analyzes the information on the surroundings to thereby calculate the driving path of the preceding vehicle.

The driving path calculating part 43 calculates the driving path of a preceding vehicle based on the information of the other vehicles acquired by the surrounding information acquiring device 3. The target path calculating part 41, for example, processes the image captured by the camera (stereo camera) of the surrounding information acquiring device 3 to thereby calculate the relative distance and relative angle between the vehicle and the preceding vehicle, and detect the position of the preceding vehicle. The position of the preceding vehicle is, for example, set to the center of the back surface of the preceding vehicle. The detected position of the preceding vehicle is mapped to the reference coordinate system as a passed point of the preceding vehicle. The target path calculating part 41 calculates the driving path of the preceding vehicle as an approximation function of the group of passed points.

Only naturally, for a single preceding vehicle, a single passed point is detected by a single image capture. Further, the vehicle is running, so the reference coordinate system having the current position of the vehicle as its origin changes with each image capture. For this reason, in order to calculate the approximation function of the group of passed points, it is necessary to convert the coordinates of passed points detected in the past while considering the amount of movement of the vehicle.

Figure 3:
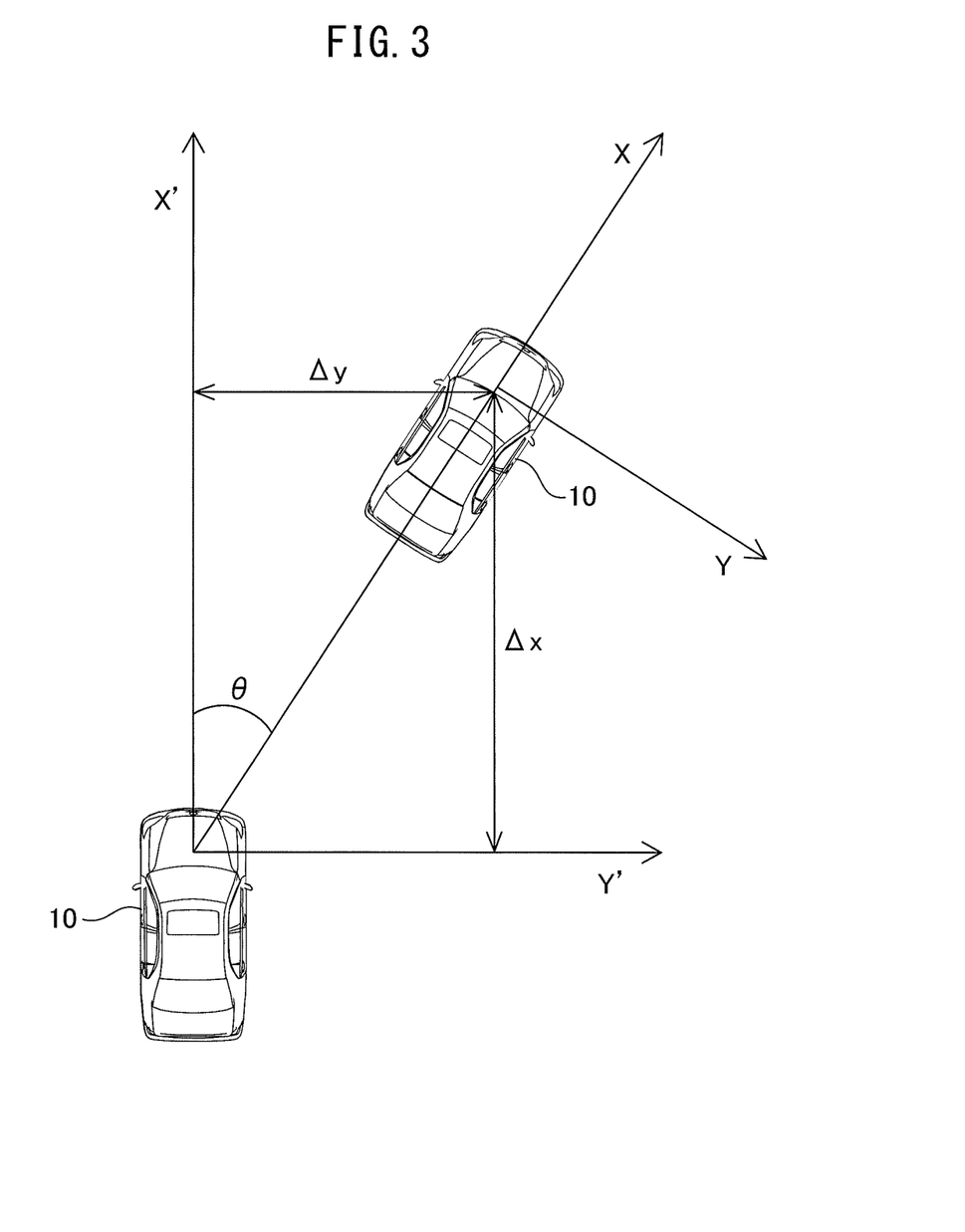
FIG. 3 is a view for explaining an amount of movement of a vehicle.

FIG. 3 is a view for explaining the amount of movement of a vehicle. FIG. 3 shows the positions of a vehicle 10 at two successive image capture timings. The amounts of movement $\Delta x$, $\Delta y$ of the vehicle 10 during an interval between the image capture timings are calculated using the following formulas (2), (3) based on the vehicle speed V and yaw angle $\theta$ of the vehicle:

$$\Delta x = V \cdot \Delta t \cdot \cos \theta \qquad (2)$$

$$\Delta y = V \cdot \Delta t \cdot \sin \theta \qquad (3)$$

The amount of movement $\Delta x$ shows the amount of movement in the x-axial direction at the previous reference coordinate system (Y', X'). The amount of movement $\Delta y$ shows the amount of movement in the y-axial direction at the previous reference coordinate system (Y', X'). The image capture interval $\Delta t$ is calculated as a reciprocal of the frame rate of the camera. The vehicle speed V is detected by the vehicle speed sensor 8. The yaw angle $\theta$ is calculated from the yaw rate detected by the yaw rate sensor 9.

The passed points detected before are respectively converted in coordinates from the previous reference coordinate system (Y', X') to the current reference coordinate system (Y, X). The coordinates of passed points (Yold, Xold) at the previous reference coordinate system (Y', X') are converted to coordinates of passed points (Ynew, Xnew) at the current reference coordinate system (Y, X) using the following formulas (4) and (5):

$$Y\text{new} = (Y\text{old} - \Delta y) \cdot \cos \theta - (X\text{old} - \Delta x) \cdot \sin \theta \qquad (4)$$

$$X\text{new} = (Y\text{old} - \Delta y) \cdot \sin \theta + (X\text{old} - \Delta x) \cdot \cos \theta \qquad (5)$$

The driving path calculating part 43 calculates the driving path as an approximation function of the group of the currently detected passed point and the coordinate converted passed points. The approximation function is, for example, defined by the above formula (1). For example, by applying the least square method to the group of passed points, the coefficients A, B, and C of the above formula (1) are calculated and the approximation function of the above formula (1) is calculated.

Note that, the target path of the vehicle and the driving path of the preceding vehicle may be calculated by another known method. For example, the approximation function of the target path and driving path may be defined by cubic functions.

Further, the target path calculating part 41 may calculate the target path of the vehicle based on the information on the surroundings and map information. In this case, the target path calculating part 41, for example, specifies the current position of the vehicle by matching the information on the surroundings with the map information, and calculates the target path based on the map information of the current position. Note that, the rough current position of the vehicle is specified using a GPS receiver.

The map information includes white line information of roads, positional information of roads, shape information of roads (for example whether curved or straight, radii of curvature of curves, road gradients, etc.), merging points, branching points, and other positional information, information on road types, etc. The map information is stored in the map database provided at vehicles and is updated using SLAM (simultaneous localization and mapping) technology etc. Note that, the target path calculating part 41 may receive the map information from outside the vehicle by vehicle-vehicle communication between the vehicle and other vehicles, road-vehicle communication through roadside devices, etc.

Figure 4:
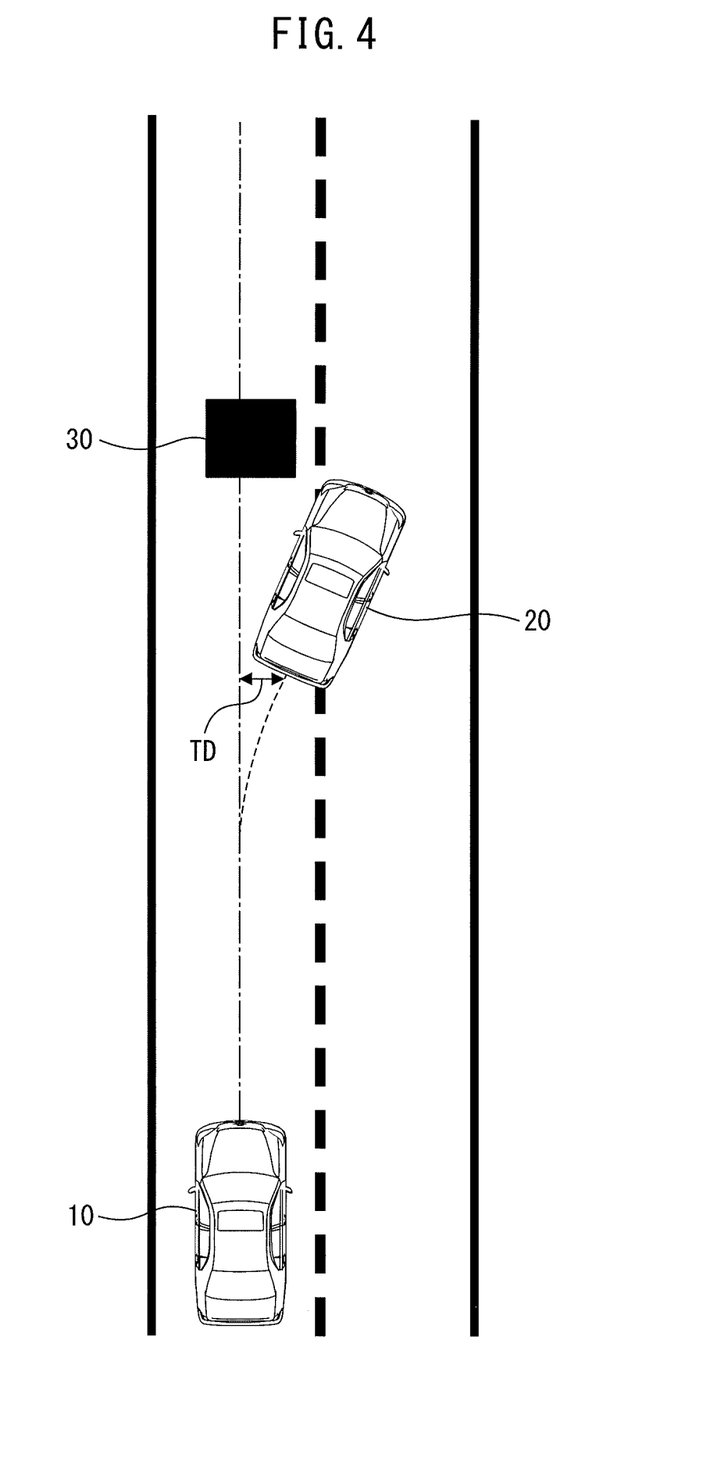
FIG. 4 is a view showing the state of a preceding vehicle avoiding an obstacle.

The processing part 44 calculates the difference between the target path of the vehicle calculated by the target path calculating part 41 and the driving path of the preceding vehicle calculated by the driving path calculating part 43 (below, referred to as "the difference in paths"). FIG. 4 is a view showing the state of the preceding vehicle 20 avoiding an obstacle 30. FIG. 4 shows the target path of the vehicle 10 by a one-dot chain line and the driving path of the preceding vehicle 20 by a broken line.

In the state of FIG. 4, the target path calculating part 41 cannot detect the obstacle 30 based on the information on the surroundings acquired by the surrounding information acquiring device 3. At this time, the target path of the vehicle 10 is set to the center positions of the broken line white line at the right side and the solid line white line at the left side. On the other hand, the driving path of the preceding vehicle 20 is deviated to the right side from the target path due to avoidance of the obstacle 30. The processing part 44, for example, calculates the amount of deviation TD in the lateral direction of the driving path from the target path as the difference in paths.

The current position of the driving path corresponds to the current position of the preceding vehicle 20 and is expressed as the coordinates ($Y_{LV}$, $X_{LV}$) in the reference coordinate system (Y, X). The position $Y_{TTJ}$ in the lateral direction (Y-axial direction) of the target path corresponding to the current position of the driving path is calculated by entering the value $X_{LV}$ of the X-coordinate of the current position of the driving path into the approximation function of the target path. The amount of deviation TD in the lateral direction is the difference between the value $Y_{LV}$ of the Y-coordinate of the current position of the driving path and the position $Y_{TTJ}$ in the lateral direction of the target path (TD=|$Y_{LV}$−$Y_{TTJ}$|).

Note that, the processing part 44 may calculate the difference in paths as the cumulative value of the amount of deviation in the lateral direction of the driving path from the target path. Further, the processing part 44 may calculate the difference in paths as the relative angle between the tangential line of the target path and the tangential line of the driving path.

The alarm part 45 issues a warning to the driver of the vehicle 10 through the information providing device 2. If detection of the obstacle 30 is delayed by the presence of a preceding vehicle 20, correction of the target path or intervention by the driver fails to be fast enough and the driving mode is liable to be forcibly switched from the automated driving mode to the manual driving mode. In this case, the driver is required to respond quickly. Further, if the driving path deviates from the target path, it is presumed that the preceding vehicle 20 is avoiding the obstacle 30.

For this reason, in the present embodiment, the alarm part 45 prompts the driver to pay attention if the difference in paths is equal to or larger than a predetermined value. The alarm part 45, for example, prompts the driver to pay attention by a buzzer, or audio information or text information of "please look forward".

Note that, the alarm part 45 may prompt the driver to perform at least one of steering and braking of the vehicle 10 if the difference in paths is equal to or larger than a predetermined value. The alarm part 45, for example, prompts the driver to steer the vehicle 10 by audio information or text information of "please turn the steering wheel". Further, the alarm part 45 prompts the driver to brake the vehicle 10 by audio or text of "please step on the brake". Further, the alarm part 45, for example, prompts the driver to steer and brake the vehicle 10 by audio information or text information of "please switch to manual operation".

That is, the alarm part 45 prompts the driver to pay attention or prompts the driver to perform at least one of steering and braking of the vehicle 10 if the difference in paths is equal to or larger than a predetermined value. By doing this, it is possible to enable the driver to foresee the presence of an obstacle 30 even if a forward obstacle 30 is hidden by a preceding vehicle 20.

<Control Routine of Alarm Processing>

Figure 5:
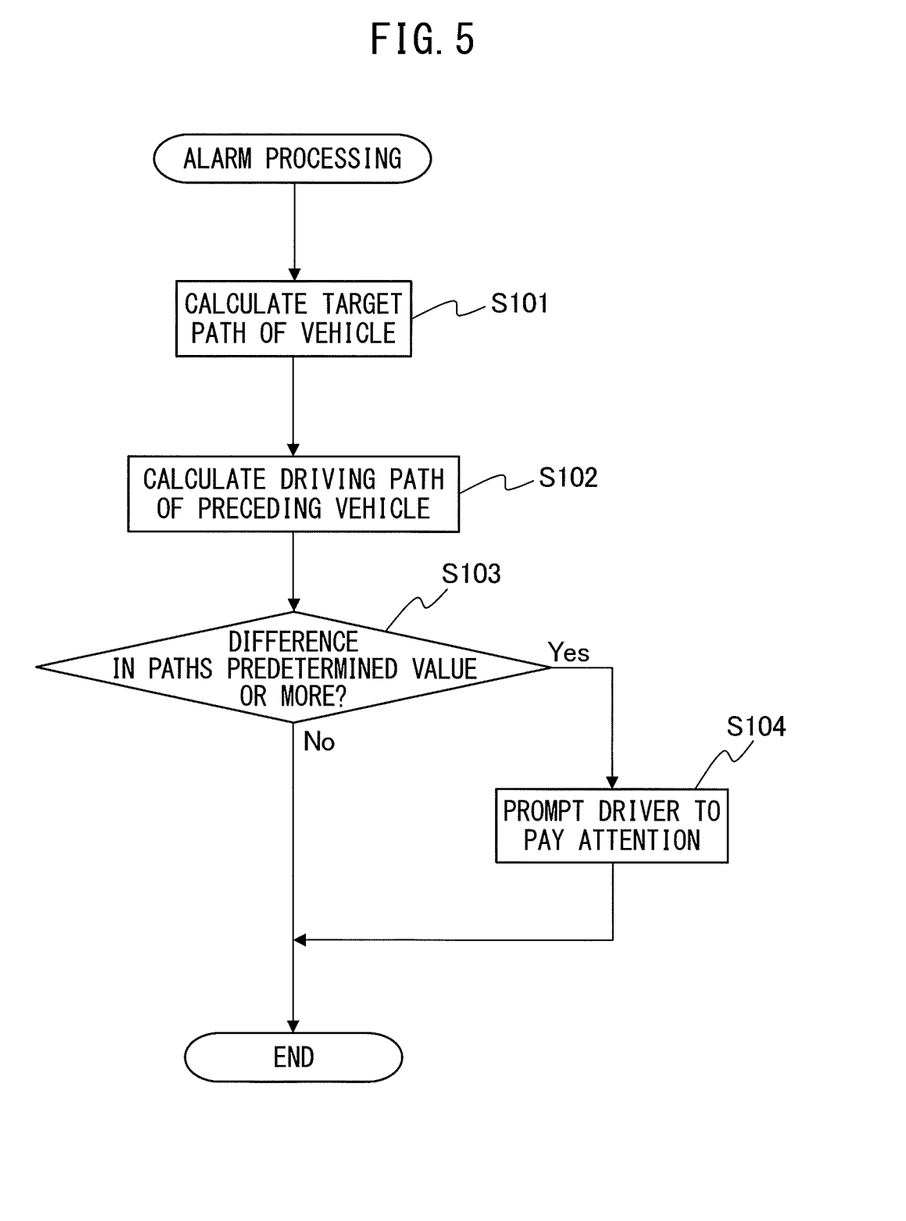
FIG. 5 is a flow chart showing a control routine of alarm processing in the first embodiment of the present invention.

FIG. 5 is a flow chart showing a control routine of alarm processing in the first embodiment of the present invention. The present control routine is repeatedly performed by the ECU 4 at a predetermined time interval while the automated driving mode is selected by the driver.

First, at step S101, the target path calculating part 41 calculates the target path of the vehicle based on the information on the surroundings acquired by the surrounding information acquiring device 3. Next, at step S102, the driving path calculating part 43 calculates the driving path of a preceding vehicle based on information on the surroundings acquired by the surrounding information acquiring device 3.

Next, at step S103, the alarm part 45 judges whether the difference in paths is equal to or larger than a predetermined value. The predetermined value is predetermined and is a value greater than zero. The difference in paths is calculated by the processing part 44 based on the target path and driving path.

If at step S103 it is judged that the difference in paths is less than the predetermined value, the present control routine ends. On the other hand, if at step S103 it is judged that the difference in paths equal to or larger than the predetermined value, the present control routine proceeds to step S104. At step S104, the alarm part 45 prompts the driver to pay attention through the information providing device 2. After step S104, the present control routine ends. Note that, at step S104, the alarm part 45 may prompt the driver to perform at least one of steering and braking of the vehicle.

Further, at step S102, the driving path calculating part 43 may calculate the driving paths of a plurality of preceding vehicles if detecting a plurality of preceding vehicles based on the information on the surroundings. In this case, the target path and the driving paths of the preceding vehicles are compared and if one or more of the differences in paths are equal to or larger than a predetermined value or more, at step S104, the alarm part 45 prompts the driver to pay attention or prompts the driver to perform at least one of steering and braking of the vehicle. Note that, there is a high possibility of a plurality of preceding vehicles following similar driving paths. For this reason, the driving path calculating part 43 may calculate the driving path of only the furthest preceding vehicle and make the driving paths of the other preceding vehicles the same as the driving path of the furthest preceding vehicle.

Second Embodiment

The configuration and control of the driving assistance system according to the second embodiment are basically similar to the configuration and control of the driving assistance system according to the first embodiment. For this reason, below, the second embodiment of the present invention will be explained focusing on the parts different from the first embodiment.

If operation of the vehicle is prompted when automated driving is being performed, the degree of tension of the driver rapidly rises. For this reason, if operation of the vehicle is prompted when danger is not approaching, the driver will feel harassed. If the difference in paths is small, there is a high possibility that danger is not approaching. However, in order to enable the driver to quickly foresee the presence of obstacles, it is desirable to prompt the driver to pay attention even when the difference in paths is small.

For this reason, in the second embodiment, the alarm part 45 prompts the driver to pay attention if the difference in paths is equal to or larger than the first reference value, and prompts the driver to perform at least one of steering and braking of the vehicle if the difference in paths is equal to or larger than the second reference value. The second reference value is larger than the first reference value. Due to this, it is possible to give a suitable alarm corresponding to the warning level to the driver. As a result, it is possible to suppress driver harassment while making the driver forsee the presence of an obstacle.

<Control Routine of Alarm Processing>

Figure 6:
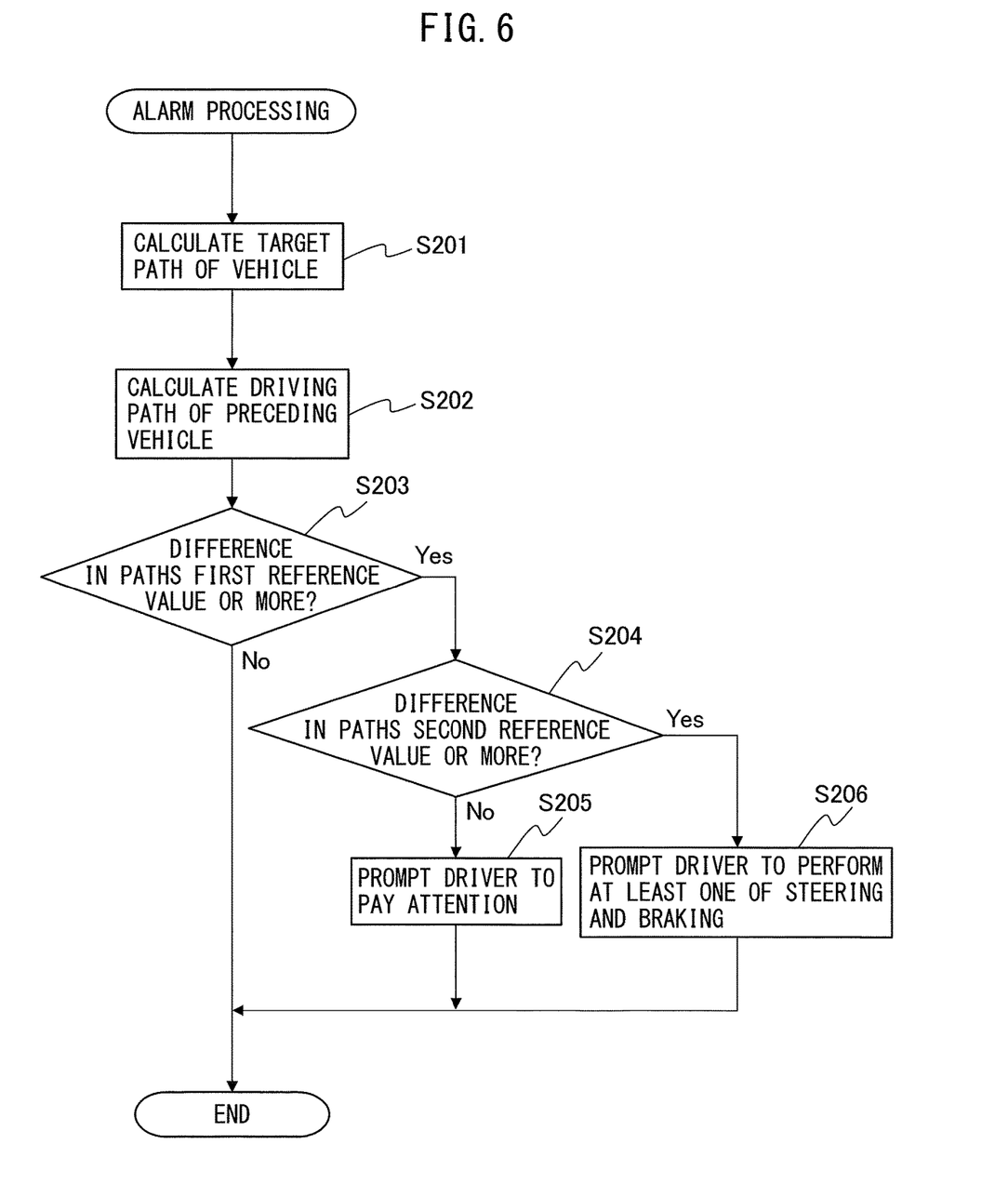
FIG. 6 is a flow chart showing a control routine of alarm processing in a second embodiment of the present invention.

FIG. 6 is a flow chart showing a control routine of alarm processing in a second embodiment of the present invention. The present control routine is performed repeatedly by the ECU 4 at a predetermined time interval while the automated driving mode is selected by the driver.

First, at step S201, the target path calculating part 41 calculates the target path of the vehicle based on information on the surroundings acquired by the surrounding information acquiring device 3. Next, at step S202, the driving path calculating part 43 calculates the driving path of the preceding vehicle based on information on the surroundings acquired by the surrounding information acquiring device 3.

Next, at step S203, the alarm part 45 judges whether the difference in paths is equal to or larger than the first reference value. The first reference value is predetermined and is a value larger than zero. The difference in paths is calculated by the processing part 44 based on the target path and driving path. If at step S203 it is judged that the difference in paths is less than the first reference value, the present control routine ends.

On the other hand, if at step S203 it is judged that the difference in paths is equal to or larger than the first reference value, the present control routine proceeds to step S204. At step S204, the alarm part 45 judges whether the difference in paths is equal to or larger than the second reference value. The second reference value is predetermined and is a value larger than the first reference value.

If at step S204 it is judged that the difference in paths is less than the second reference value, that is, it is judged that the difference in paths is the first reference value to less than the second reference value, the present control routine proceeds to step S205. At step S205, the alarm part 45 prompts the driver to pay attention. After step S205, the present control routine is ended.

On the other hand, if at step S204 it is judged that the difference in paths is equal to or larger than the second reference value, the present control routine proceeds to step S206. At step S206, the alarm part 45 prompts the driver to perform at least one of steering and braking of the vehicle. After step S206, the present control routine ends.

Note that, at step S206, the vehicle control part 42 may brake the vehicle. In this case, the vehicle control part 42 operates the brake 6 to thereby make the vehicle gently decelerate. Due to braking of the vehicle, it is possible to secure time for the driver to deal with an obstacle and possible to raise more the degree of safety of the vehicle.

Further, if at step S206 the vehicle control part 42 brakes the vehicle, at step S205, the alarm part 45 may prompt the driver to perform at least one of steering and braking of the vehicle. Further, the alarm part 45 may instruct the driver of the direction in which the driving path deviates from the target path of the vehicle as a steering direction if prompting the driver to steer the vehicle. By doing this, the driver can more quickly deal with an obstacle. Note that, the direction in which the driving path deviates from the target path of the vehicle is calculated by the processing part 44.

Above, preferred embodiments according to the present invention were explained, but the present invention is not limited to these embodiments. Various corrections and changes may be made within the language of the claims.

REFERENCE SIGNS LIST

1 driving assistance system
2 information providing device
3 surrounding information acquiring device
4 electronic control unit (ECU)
41 target path calculating part
42 vehicle control part
43 driving path calculating part
44 processing part
45 alarm part

The invention claimed is:

1. A driving assistance system comprising:
a human-machine interface (HMI) including at least one of a touch screen, a display, a microphone, or a speaker, for providing information to a driver of a vehicle;
a surrounding information acquiring device including at least one of a camera, a milliwave radar, LIDAR (laser imaging detection and ranging) or sonar, for acquiring information on surroundings of the vehicle;
at least one electronic control unit (ECU) provided with a processor programmed to:
calculate a target path of the vehicle based on the information on the surroundings;
control the vehicle to move along the target path;
calculate a driving path of a preceding vehicle running in the same lane as the vehicle based on the information on the surroundings;
calculate a difference between the target path and the driving path; and
issue an alarm to the driver through the HMI, wherein the at least one ECU is further programmed to issue the alarm to prompt the driver to pay attention or prompt the driver to perform at least one of steering and braking of the vehicle if the difference between the target path and the driving path is equal to or larger than a predetermined value.

2. The driving assistance system according to claim 1, wherein the alarm is configured to prompt the driver to pay attention if the difference is equal to or larger than a first reference value, and prompt the driver to perform at least one of steering and braking of the vehicle if the difference is equal to or larger than a second reference value, and the second reference value is larger than the first reference value.

3. The driving assistance system according to claim 2, wherein
the at least one ECU is further programmed to:
calculate a direction in which the driving path deviates from the target path, and
prompt the driver, using the HMI, to steer the vehicle and instruct the driver of the direction in which the driving path deviates from the target path as a steering direction if the difference is equal to or larger than the second reference value.

4. The driving assistance system according to claim 1, wherein
the at least one ECU is further programmed to:
prompt the driver, using the HMI, to pay attention if the difference is equal to or larger than a first reference value, and
brake the vehicle if the difference is equal to or larger than a second reference value and the second reference value is larger than the first reference value.

5. The driving assistance system according to claim 1, wherein
the at least one ECU is further programmed to:
prompt the driver, using the HMI, to perform at least one of steering and braking of the vehicle if the difference is equal to or larger than a first reference value, and
brake the vehicle if the difference is equal to or larger than a second reference value and the second reference value is larger than the first reference value.

6. The driving assistance system according to claim 5, wherein
the at least one ECU is further programmed to;
calculate a direction in which the driving path deviates from the target path, and
prompt the driver, using the HMI, to steer the vehicle and instruct the driver of the direction in which the driving path deviates from the target path as a steering direction if the difference is equal to or larger than the first reference value.

7. A driving assistance method using an electronic control unit (ECU) including a processor, comprising:
provproviding information to a driver of a vehicle via a human-machine interface (HMI);
acquiring information on surroundings of the vehicle from at least one of a camera, a milliwave radar, LIDAR (laser imaging detection and ranging) or sonar,
calculating a target path of the vehicle based on the information on the surroundings;
controlling the vehicle to move along the target path;
calculating a driving path of a preceding vehicle running in the same lane as the vehicle based on the information on the surroundings;
calculating a difference between the target path and the driving path; and
issuing an alarm to the driver through the HMI, wherein the alarm prompts the driver to pay attention or prompts the driver to perform at least one of steering and braking of the vehicle if the difference between the target path and the driving path is equal to or larger than a predetermined value.

\* \* \* \* \*